United States Patent [19]

Ando et al.

[11] Patent Number: 4,767,844

[45] Date of Patent: Aug. 30, 1988

[54] AZO LAKE PIGMENTS

[75] Inventors: Hirohito Ando, Itako; Zenji Takada; Shigeto Aoki, both of Kamisu; Yuko Shigeta, Choshi, all of Japan

[73] Assignee: Dainippon Ink and Chemicals, Inc., Tokyo, Japan

[21] Appl. No.: 88,975

[22] Filed: Aug. 21, 1987

Related U.S. Application Data

[62] Division of Ser. No. 866,065, May 20, 1986, abandoned.

[30] Foreign Application Priority Data

May 20, 1985 [JP] Japan ................................ 60-105975

[51] Int. Cl.$^4$ ........................ C09B 63/00; C09D 5/00; C09D 11/02
[52] U.S. Cl. ........................................ 534/573; 8/641; 106/23; 106/402; 106/496; 534/581; 534/738; 534/742; 534/746; 534/747; 534/863; 534/864; 534/874
[58] Field of Search .................. 534/573 M, 573, 874, 534/863, 864, 581, 738, 742, 786, 747; 106/288 Q, 289, 308 Q; 8/641

[56] References Cited

U.S. PATENT DOCUMENTS 4,217,273 8/1980 Von .................................. 534/874 X
4,530,724 7/1985 Ueno et al. ...................... 534/874 X

FOREIGN PATENT DOCUMENTS 797850 7/1958 United Kingdom ................ 534/573

*Primary Examiner*—Floyd D. Higel
*Attorney, Agent, or Firm*—Sherman and Shalloway

[57] ABSTRACT

An azo lake pigment is obtained by coupling an aromatic diazo component having a sulfonic acid group with a mixture of 2-hydroxy-3-naphthoic acid and a 2-hydroxy-3-naphthoic acid derivative represented by formula [I]

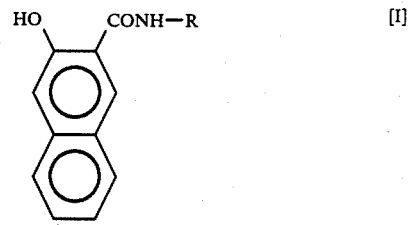

wherein R represents a hydrogen atom, a naphthalene residue, a cyclohexyl group, or a group of the formula

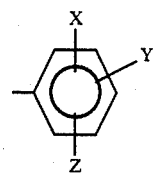

in which each of X, Y and Z represents a hydrogen atom, a lower alkyl group, a lower alkoxy group, a halogen atom, an acetylamino group, a benzoylamino group, a carbomoyl group or a phenylcarbamoyl group, and X and Y together may form a cyclized benzimidazolone, benzthiazole or benzoxazole group, and laking the resulting dye with an alkaline earth metal salt or a manganese salt.

7 Claims, No Drawings

AZO LAKE PIGMENTS

This is a division of application Ser. No. 866,065, filed May 20, 1986 and now abandoned.

This invention relates to azo lake pigments having excellent transparency, color strength and dispersability. The azo lake pigments are useful particularly as coloring agents for lithographic and letterpress inks, gravure inks, paints and plastics.

To increase the transparency of azo lake pigments, it is generally necessary to inhibit the growth of crystal pigment particles. For this purpose, there have been previously disclosed (1) the treatment of the pigment with rosin (main ingredient: abietic acid) (U.S. Pat. No. Re. 18,750); (2) the use of 2-hydroxy-3-naphthoic acid as a coupler component and alpha-substituted-2-hydroxy-3-naphthoic acid as a cocoupler component (U.S. Pat. No. 4,217,273); and (3) the use of, as cocoupler components, beta-naphthol and a phenolic by-product which is obtained during the reaction of a beta-naphthol alkali salt with carbon dioxide (U.S. Pat. No. 4,530,724). In method (1), rosin is used in an amount of 10 to 30% by weight based on the pigment so that the reduction in tinting strength cannot be avoided. According to method (2), a pigment of stable quality is difficult to obtain, and the pigment has a dark hue and lacks vividness because the alpha-substituted-2-hydroxy-3-naphthoic acid used contains various impurities according to its synthesis conditions. Method (3) has the disadvantage that as is the case with Pigment Red 53 (laked with barium, but the laking is insufficient with calcium) or Pigment Red 49, the resulting pigment has poor water resistance and is restricted in regard to the type of the laking metal or to utility, because the use of beta-naphthol achieves only a low degree of laking with the metal.

It is an object of this invention to provide an azo lake pigment having the desired transparency which can be produced under stable conditions without decreasing its color strength.

As a result of extensive investigations, the present inventors have unexpectedly found that the use of a 2-hydroxy-3-naphthoic acid derivative, which is a coupler component of an insoluble azo pigment, as a cocoupler component together with 2-hydroxy-3-naphthoic acid as a coupler component gives a pigment having excellent transparency, a high color strength, a very clear and vivid hue and good water resistance.

According to this invention, there is provided an azo lake pigment, which is obtained by coupling an aromatic diazo component having a sulfonic acid group with a mixture of 2-hydroxy-3-naphthoic acid and a 2-hydroxy-3-naphthoic acid derivative represented by formula [I]

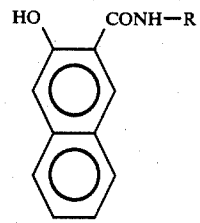

[I]

wherein R represents a hydrogen atom, a naphthalene residue, a cyclohexyl group, or a group of the formula

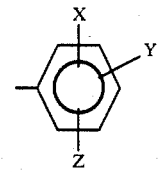

in which each of X, Y and Z represents a hydrogen atom, a lower alkyl group, a lower alkoxy group, a halogen atom, an acetylamino group, a benzoylamino group, a carbamoyl group or a phenylcarbamyl group, and X and Y together may form a cyclized benzimidazolone, benzothiazole or benzoxazole group, and laking the resulting dye with an alkaline earth metal salt or a manganese salt.

The aromatic diazo component having a sulfonic acid group used in this invention includes aromatic compounds having an amino group and a sulfonic acid group. Specific examples include aminobenzenesulfonic acids such as 2-aminobenzenesulfonic acid, 3-aminobenzenesulfonic acid, 4-aminobenzenesulfonic acid, 2-amino-4-methylbenzenesulfonic acid, 2-amino-5-methylbenzenesulfonic acid, 3-amino-4-methylbenzenesulfonic acid, 4-amino-3-methylbenzenesulfonic acid, 2-amino-4-methoxybenzenesulfonic acid, 2-amino-5-methoxybenzenesulfonic acid, 4-amino-3-methoxybenzenesulfonic acid, 4-amino-3-chlorobenzenesulfonic acid, 4-amino-3-nitrobenzenesulfonic acid, 2-amino-4-chlorobenzenesulfonic acid, 2-amino-5-chlorobenzenesulfonic acid, 2-amino-5-bromobenzenesulfonic acid, 5-amino-2-chlorobenzenesulfonic acid, 2-amino-5-nitrobenzenesulfonic acid, 2-amino-4-ethoxybenzenesulfonic acid, 2-amino-5-ethylbenzenesulfonic acid, 4-amino-2,5-dichlorobenzenesulfonic acid, 5-amino-2,4-dichlorobenzenesulfonic acid, 4-amino-2,5-dibromobenzenesulfonic acid, 5-acetylamino-2-aminobenzenesulfonic acid, 4-amino-2,5-dimethoxybenzenesulfonic acid, 4-amino-2,5-dimethylbenzenesulfonic acid, 4-amino-3-benzoylaminobenzenesulfonic acid, 4-amino-5-methoxy-2-methylbenzenesulfonic acid, 4-amino-5-chloro-2-methylbenzenesulfonic acid, 2-amino-6-chloro-4-methylbenzenesulfonic acid, 2-amino-5-chloro-4-ethylbenzenesulfonic acid, 2-amino-5-chloro-4-methoxybenzenesulfonic acid, 2-amino-5-chloro-3-methylbenzenesulfonic acid, 2-amino-5-bromo-4-methylbenzenesulfonic acid and 3-amino-5-chloro-4-methylbenzenesulfonic acid; aminonaphthalenesulfonic acids such as 2-amino-1-naphthalenesulfonic acid, 5-amino-1-naphthalenesulfonic acid, 5-amino-2-naphthalenesulfonic acid, 8-amino-1-naphthalenesulfonic acid, 5-acetylamino-2-amino-1-naphthalenesulfonic acid, 2-amino-8-benzoylamino-1-naphthalenesulfonic acid and 6-amino-2-naphthalenesulfonic acid; aminonaphthalenedisulfonic acids such as 7-amino-1,3-naphthalenedisulfonic acid, 6-amino-1,3-naphthalenedisulfonic acid and 2-amino-6,8-naphthalenedisulfonic acid; 4-(4'-amino-3'-methoxyphenylazo)benzenesulfonic acid; and 4,4'-diaminodiphenyl-2,2'-disulfonic acid. Preferred among these are 2-aminobenzenesulfonic acid, 4-aminobenzenesulfonic acid, 2-amino-5-methylbenzenesulfonic acid, 2-amino-5-methoxybenzenesulfonic acid, 2-amino-5-chloro-4-methylbenzenesulfonic acid, 2-amino-4- chloro-5-methylbenzenesulfonic acid and 2-amino-1-naphthalenesulfonic acid.

Many of the compounds of formula [I] used as the cocoupler component are commercially available under the generic name Naphthol AS. Those which are not commercially available can be easily synthesized in a fixed high purity. For this reason, by choosing the ratio of mixing it with the coupler component, azo lake pigments having adaptability to practical applications as represented by a clear and vivid color hue, a controlled particle size, excellent gloss and flowability can be produced with good reproducibility. Compounds of formula [I] in which R is a hydrogen atom or a phenyl group, i.e. 2-hydroxy-3-naphthamide and/or 2-hydroxy-3-naphthanilide, are especially preferred because they are available easily at low costs and gives azo lake pigments of excellent transparency.

Furthermore, since no special apparatus or reaction conditions are required for the production of azo lake pigments having such excellent adaptability, the process of this invention can be carried out easily.

The process for producing the azo lake pigments can be carried out in a customary manner, and is not particularly restricted. For example, an aromatic amino compound having a sulfonic acid group is diazotized at $-10°$ to $10°$ C. to prepare a diazo component. On the other hand, a mixture of 2-hydroxy-3-naphthoic acid and the compound of formula [I], preferably a mixture of 50 to 99% by weight of 2-hydroxy-3-naphthoic acid and 50 to 1% by weight of the compound of formula [I], is dissolved in an aqueous solution of sodium hydroxide to prepare a coupler solution. The diazo component is added dropwise to the coupler solution to perform coupling reaction at a temperature of generally $-50°$ to $50°$ C., preferably $-10°$ to $20°$ C. The resulting dye slurry is then laked with an alkaline earth metal salt or a manganese salt to give an azo lake pigment. If required, the pigment slurry or wet cake may be treated with an anionic surface-active agent such as a fatty acid, a dialkyl sulfosuccinate or rosin, or a metal (calcium, strontium, barium, etc.) salt thereof, or with a cationic surface-active agent such as an aliphatic primary amine, an aliphatic secondary amine, an aliphatic tertiary amine, an aliphatic diamine or an alkyl quaternary ammonium chloride, or with various commercial nonionic surface-active agents. For such a treatment, reference may be made to West German OLS No. 1,619,584, British Pat. No. 1,187,116, U.S. Pat. No. 3,560,235, U.S. Pat. No. 3,582,380, and British Pat. No. 1,080,115.

The azo lake pigment slurry after the laking reaction is then directly filtered, and washed with water. To improve the dispersibility of the pigment and retain its transparency, the pigment particles may be aged by stirring the slurry at 70° to 95° C. for about 30 minutes to 3 hours.

The wet cake of the pigment obtained by this process may be flushed and kneaded directly into a varnish for inks or a resin for paints to prepare a so-called base color. The wet cake may be dried and pulverized to a suitable size to form a powdery pigment.

Examples of the lower alkyl group for X, Y and Z in formula [I] are methyl and ethyl groups. Examples of the lower alkoxy group for X, Y and Z are methoxy and ethoxy groups and examples of the halogen atom are chlorine, bromine and fluorine atoms.

Illustrative of the alkaline earth metal salt used to lake the dye obtained by the coupling reaction are inorganic and organic acid salts, such as sulfates, nitrates, hydrochlorides, acetates and formates of calcium, strontium, barium, etc. Examples of the manganese salts are the above inorganic and organic acid salts of manganese.

The azo lake pigment in accordance with this invention can be produced in a fixed quality with good reproducibility, and has excellent transparency, a high color strength, a clear and vivid hue and good water resistance. Hence, when it is used in an ink or a paint, the ink or paint film shows good gloss.

The following Examples, Comparative Examples and Test Examples illustrate the present invention more specifically. All parts in these examples are by weight.

EXAMPLE 1

One hundred parts of 2-amino-5-methylbenzenesulfonic acid was dispersed in 1,500 parts of water, and 105 parts of 20% hydrochloric acid was added. While the dispersion was maintained below 5° C., 124 parts of a 30% aqueous solution of sodium nitrite was added dropwise to perform diazotization and prepare a diazo solution.

Separately, 90 parts of 2-hydroxy-3-naphthoic acid and 10 parts of 2-hydroxy-3-naphthoic acid-5'-chloro-2',4'-dimethoxyanilide were dispersed in 3,000 parts of water, and 95 parts of a 48% aqueous solution of sodium hydroxide was added. The solution was cooled to below 5° C. to prepare a coupler solution. With stirring, the diazo solution was added dropwise to the coupler solution. After the coupling reaction, the reaction mixture was added to a solution of 90 parts of calcium chloride hydrate in 500 parts of water, and the mixture was stirred for 60 minutes. After the laking reaction, the reaction mixture was heated and stirred at 80° C. for 30 minutes. The reaction mixture was hot-filtered, washed with water, and then dried at 90° C. to give 232 parts of a bluish red pigment powder.

COMPARATIVE EXAMPLE 1

Example 1 was repeated except that the amount of 2-hydroxy-3-naphthoic acid used was changed to 97.7 parts, and 2-hydroxy-3-naphthoic acid-5-chloro-2',4'-dimethoxyanilide was not used. There was obtained 228 parts of a bluish red pigment powder.

COMPARATIVE EXAMPLE 2

Example 1 was repeated except that 8.5 parts of beta-naphthol was used instead of 10 parts of 2-hydroxy-3-naphthoic acid-5'-chloro-2',4'-dimethoxyanilide. There was obtained 220 parts of a bluish red powder.

TEST EXAMPLE 1

The bluish red pigment powders obtained in Example 1 and Comparative Examples 1 and 2 were each subjected to a water resistance test in accordance with the method of JIS K-5101-12. The degrees of coloration of the supernatant liquids were compared. The pigment of Comparative Example 2 obtained by using beta-naphthol as a cocoupler component showed marked coloration. The pigments of Example 1 and Comparative Example 2 had much the same good water resistance. These test samples were filtered and sufficiently washed with distilled water until there was no coloration. They were again dried, and subjected to X-ray diffraction spectrometry. It was found that the pigment of Comparative Example 1 had a sharp and high peak and a narrow half-value width and showed the greatest growth of crystals. The pigments of Comparative Example 2 and Example 1 had lesser peak strengths in this order, and this fact showed the inhibited growth of crystals. The sizes of the crystal particles were as follows:

Pigment of Comparative Example 1 > pigment of Comparative Example 2 > pigment of Example 1.

The pigment of Example 1 was composed of a pigment having the structure

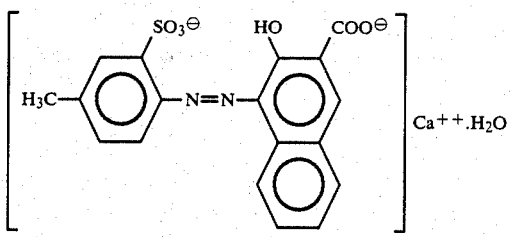

and a pigment having the structure

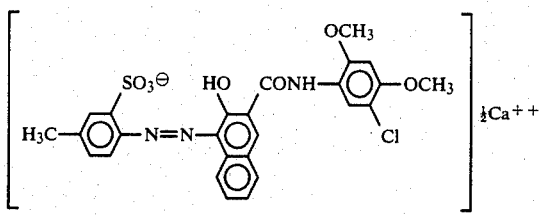

in a theoretical ratio of 9:1. The chlorine content analyzed agreed approximately with the calculated value as shown below.

|  | Calculated | Found |
|---|---|---|
| Chlorine | 0.49% | 0.52% |

TEST EXAMPLE 2

Each of the pigments (18.0 parts) obtained in Example 1 and Comparative Examples 1 and 2, 82.0 parts of an ink varnish and 5.0 parts of light oil were passed three times over a three-roll mill (Buhler) at 40° C. to prepare an ink. The tack values of the resulting inks were caused to agree with each other, and the inks were subjected to a printing test by an RI tester to measure their hue, chroma, color strength, gloss and transparency. They were also tested for flowability.

The hue was evaluated by visual observation using the hue of a material printed with the pigment of Comparative Example 1 as a standard.

The chroma was measured by a spectrophotometer using a material printed with the pigment of Comparative Example 1 as a standard.

The color strength was measured by a reflection densitometer (Gretag densitometer).

The gloss was measured by a photometer (60°).

The transparency was measured on a printed material on a black art paper in accordance with JIS K-5101 Method B, and evaluated on the following scale using the printed material of the pigment of Comparative Example 2 as a standard (3: ordinary).

5: very transparent
4: transparent
3: ordinary
2: opaque
1: very opaque

The flowability was measured as follows:

The ink (1.0 g) was caused to flow on a glass plate placed at an angle of 70°, and the distance over which the ink flowed during a period of 30 minutes was measured.

The results are shown in Table 1.

TABLE 1

|  | Hue | Chroma $\Delta C^*$ | Color strength | Gloss (%) | Transparency | Flowability (mm) |
|---|---|---|---|---|---|---|
| Comparative Example 1 | Bluish red (standard) | Standard | 1.30 | 62 | 2 | 110 |
| Comparative Example 2 | Slightly yellowish red | −2.0 | 1.75 | 67 | 3 (standard) | 90 |
| Example 1 | Slightly yellowish red | +1.5 | 2.28 | 75 | 5 | 115 |

The pigment of Example 1 had a high chroma (vividness), good gloss, a high color strength and high flowability.

EXAMPLES 2–15

Example 1 was repeated except that each of the compounds of formula [I] shown in Tables 2 and 3 was used instead of 2-hydroxy-3-naphthoic acid-5'-chloro-2',4'-dimethoxyanilide. A red pigment powder was obtained in each run. The hues, color strengths, glosses and transparencies of the resulting red pigments are shown in Tables 2 and 3. The "content" in Tables 2 and 3 means the content (weight percent) of the compound of formula [I] in the mixture of it with 2-hydroxy-3-naphthoic acid.

TABLE 2

| Example | Compound of formula [I] | Content (%) | Hue | Color strength (—) | Gloss (%) | Transparency |
|---|---|---|---|---|---|---|
| 2 | HO-C₁₀H₆-CONH-C₆H₄-OC₂H₅ | 10 | Bluish red | 2.22 | 73 | 5 |
| 3 | HO-C₁₀H₆-CONH-C₆H₄-CH₃ | 10 | Bluish red | 2.20 | 76 | 5 |
| 4 | HO-C₁₀H₆-CONH-C₆H₃(NH)₂C=O | 20 | Bluish red | 2.40 | 75 | 5 |
| 5 | HO-C₁₀H₆-CONH₂ | 20 | Slightly bluish red | 2.02 | 71 | 5 |
| 6 | HO-C₁₀H₆-CONH-C₆H₂(OCH₃)₂Cl | 48 | Red | 2.32 | 74 | 5 |
| 7 | HO-C₁₀H₆-CONH-C₆H₄-Br | 48 | Red | 2.05 | 73 | 5 |

TABLE 2-continued

| Example | Compound of formula [I] | Content (%) | Hue | Color strength (—) | Gloss (%) | Transparency |
|---|---|---|---|---|---|---|
| 8 | HO-[naphthalene]-CONH-[phenyl with CH3 and OCH3] | 5 | Bluish red | 2.45 | 75 | 4 |

TABLE 3

| Example | Compound of formula [I] | Content (%) | Hue | Color strength (—) | Gloss (%) | Transparency |
|---|---|---|---|---|---|---|
| 9 | HO-[naphthalene]-CONH-[phenyl-benzothiazolinone with S, C=O, NH] | 5 | Bluish red | 2.30 | 70 | 4 |
| 10 | HO-[naphthalene]-CONH-[phenyl-CF3] | 2 | Bluish red | 2.02 | 69 | 4 |
| 11 | HO-[naphthalene]-CONH-[phenyl-F] | 2 | Bluish red | 2.01 | 68 | 4 |
| 12 | HO-[naphthalene]-CONH-[phenyl with Cl, CH3, CONH-phenyl] | 30 | Red | 2.08 | 72 | 5 |
| 13 | HO-[naphthalene]-CONH-[phenyl]-NHCOCH3 | 30 | Bluish red | 2.39 | 70 | 5 |

TABLE 3-continued

| Example | Compound of formula [I] | Content (%) | Hue | Color strength (−) | Gloss (%) | Transparency |
|---|---|---|---|---|---|---|
| 14 | HO, CONH—C₆H₄—CONH₂ (on 2-hydroxy-3-naphthoyl) | 40 | Red | 2.32 | 73 | 5 |
| 15 | HO, CONH—C₆H₃(OCH₃)—CONH—C₆H₃(CH₃)(Cl) (on 2-hydroxy-3-naphthoyl) | 40 | Red | 2.41 | 73 | 5 |

EXAMPLE 16

Sodium 2-amino-4-chloro-5-methylbenzenesulfonate (30.0 parts) was dissolved in 600 parts of hot water, and the solution was cooled with ice to 0° C. A solution of 15 parts of sodium nitrite in 30 parts of cold water was added, and then 20 parts of 35% hydrochloric acid was added to perform diazotization and prepare a diazo solution.

Separately, 27 parts of 2-hydroxy-3-naphthoic acid and 3 parts of 2-hydroxy-3-naphthamide were dispersed in 2,000 parts of water, and 63.4 parts of a 20% aqueous solution of sodium hydroxide was added. The mixture was heated to 40° C. to form a solution. Ice was added to the solution to cool it to 0° C. and thus to prepare a coupler solution. The diazo solution was added dropwise to the coupler solution. After the coupling reaction, the pH of the reaction mixture was adjusted to 8.0, and it was heated to 40° C. Crystal conversion of the dye was ascertained under a microscope. Thereafter, a solution of 42.5 parts of crystalline strontium chloride in 1,000 parts of water was added dropwise to lake the dye. The mixture was heated at 90° C. for 1 hour, fully washed with water, and dried to give 59.4 parts of a red pigment powder.

COMPARATIVE EXAMPLE 3

Example 16 was repeated except that the amount of 2-hydroxy-3-naphthoic acid was changed to 30 parts, and 2-hydroxy-3-naphthamide was not used. There was obtained 59.8 parts of a red pigment powder.

TEST EXAMPLE 3

Each of the pigments (12 parts) obtained in Example 16 and Comparative Example 3, 52 parts of a melamine alkyd resin (melamine:alkyd=3:7), 52 parts of xylene and 120 parts of glass beads were put in a polyethylene bottle and dispersed for 1 hour by means of a paint conditioner. Fifty parts of the melamine alkyd resin was additionally put in the bottle, and the entire mixture was dispersed for 10 minutes by the paint conditioner. The glass beads were then separated by filtration to prepare a red paint. The paint was blown onto a plate, and then baked to form a coated film. The hue, gloss and transparency of the coated film are shown in Table 4.

TABLE 4

|  | Hue | Gloss (%) | Transparency |
|---|---|---|---|
| Example 16 | Slightly bluish red | 93 | 5 |
| Comparative Example 3 | Slightly bluish red | 74 | 2 |

EXAMPLES 17–25

Pigments were synthesized from the diazo components, laking metals and compounds of formula [I] shown in Table 5, and tested in accordance with Test Example 3. The results are shown in Table 5.

TABLE 5

| Example | Diazo component | Laking metal | Compound of formula [I] | Content (%) | Hue | Gloss (%) | Transparency |
|---|---|---|---|---|---|---|---|
| 17 | SO₃H, H₃C-, Cl-, -NH₂ (benzene) | Sr | HO, CONH-, CH₃ (naphthol anilide with o-CH₃) | 10 | Slightly yellowish red | 92 | 5 |
| 18 | | Ba | HO, CONH- (naphthol anilide) | 10 | Yellowish red | 90 | 5 |
| 19 | | Mn | HO, CONH- naphthyl (naphthol naphthylamide) | 10 | Red | 95 | 5 |
| 20 | H₃C-, Cl-, -NH₂, SO₃H (benzene) | Ca | HO, CONH-, Cl (naphthol o-chloroanilide) | 10 | Red | 91 | 5 |
| 21 | SO₃H, -NH₂ (naphthalene) | Ca | HO, CONH-cyclohexyl, H | 10 | Bordeaux color | 95 | 5 |
| 22 | SO₃H, H₃C-, -NH₂ (benzene) | Ca | HO, CONH-, benzimidazolone (NH-C=O-NH) | 10 | Bluish red | 98 | 5 |

TABLE 5-continued

| Example | Diazo component | Laking metal | Compound of formula [I] | Content (%) | Hue | Gloss (%) | Transparency |
|---|---|---|---|---|---|---|---|
| 23 | | Sr | | 10 | Bluish red | 91 | 5 |
| 24 | | Sr | | 10 | Brown | 93 | 5 |
| 25 | | Sr | | 10 | Bluish red | 95 | 5 |

What is claimed is:

1. An azo lake pigment obtained by laking a dye with an alkaline earth metal salt or a manganese salt, said dye being obtained by coupling an aromatic diazo component having a sulfonic acid group with a mixture of 2-hydroxy-3-naphthoic acid and a 2-hydroxy-3-naphthoic acid derivative represented by the formula (I)

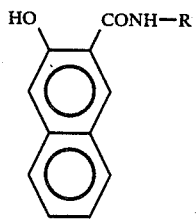

wherein R represents hydrogen, naphthalene, cyclohexyl, or a group of the formula

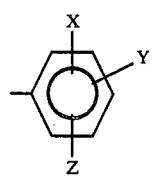

in which each of X, Y and Z, independently, represents hydrogen, lower alkyl, lower alkoxy trifluoromethyl, halogen, acetylamino, benzoylamino, carbamoyl or phenylcarbamoyl, or X and Y together form a cyclized benzimidazolone, benzothiazole or benzoxazole.

2. The azo lake pigment of claim 1 wherein the aromatic diazo component having a sulfonic acid group is at least one compound selected from the group consisting of aminobenzenesulfonic acids, aminonaphthalenesulfonic acids, aminonaphthalenedisulfonic acids, 4-(4'-amino-3'-methoxyphenylazo)-benzenesulfonic acid and 4,4'-diaminodiphenyl-2,2'-disulfonic acid.

3. The azo lake pigment of claim 1 wherein the aromatic diazo component having a sulfonic acid group is at least one compound selected from the group consisting of 2-aminobenzenesulfonic acid, 4-aminobenzenesulfonic acid, 2-amino-5-methylbenzenesulfonic acid, 2-amino-5-methylbenzenesulfonic acid, 2-amino-5-chloro-4-methylbenzenesulfonic acid, 2-amino-4-chloro-5-methylbenzenesulfonic acid and 2-amino-1-naphthalenesulfonic acid.

4. The azo lake pigment of claim 1 wherein the coupling component is a mixture of 50 to 99% by weight of 2-hydroxy-3-naphthoic acid and 50 to 1% by weight of the 2-hydroxy-3-naphthoic acid derivative of formula (I).

5. The azo lake pigment of claim 1 or 4 wherein the 2-hydroxy-3-naphthoic acid derivative of formula (I) is 2-hydroxy-3-naphthamide, 2-hydroxy-3-naphthanilide or a mixture thereof.

6. The azo lake pigment of claim 1 wherein the alkaline earth metal salt or manganese salt is a calcium, strontium or barium or manganese salt of at least one acid selected from the group consisting of sulfuric acid, nitric acid, hydrochloric acid, acetic acid and formic acid.
7. The azo lake pigment of claim 1 comprising a mixture of
a pigment of the structure
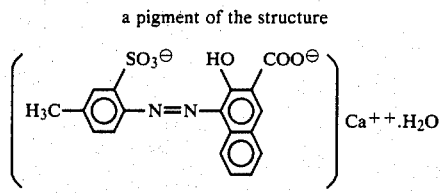 (A)
and
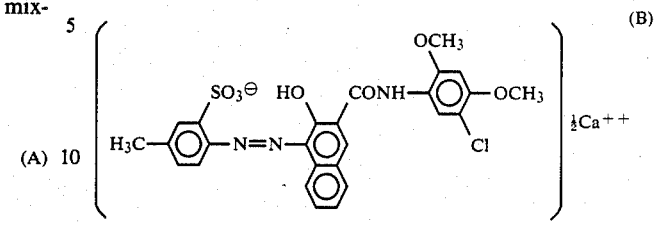 (B)
in an (A)/(B) ratio of about 9:1.
* * * * *

UNITED STATES PATENT AND TRADEMARK OFFICE
CERTIFICATE OF CORRECTION

PATENT NO. : 4,767,844
DATED : August 30, 1988
INVENTOR(S) : HIROHITO ANDO, ET AL.

It is certified that error appears in the above-identified patent and that said Letters Patent is hereby corrected as shown below:

Delete the title in its entirety and insert the following therefor:

--AZO LAKE PIGMENTS OBTAINED FROM A MIXTURE OF 2-HYDROXY-3-NAPHTHOIC ACID AND AN AMIDE-TYPE DERIVATIVE THEREOF COUPLED TO AN AROMATIC DIAZO COMPONENT--.

IN THE ABSTRACT

Line 5 from bottom, delete "carbomoyl", insert --carbamoyl--.

Line 3 from bottom, delete "benzthiazole", insert --benzothiazole--.

Signed and Sealed this
Sixth Day of June, 1989

Attest:

DONALD J. QUIGG

Attesting Officer    Commissioner of Patents and Trademarks